March 31, 1964
J. STELL ETAL
3,126,987
DECELERATOR BRAKE FOR MOTOR VEHICLES
Filed Sept. 15, 1959
2 Sheets-Sheet 1
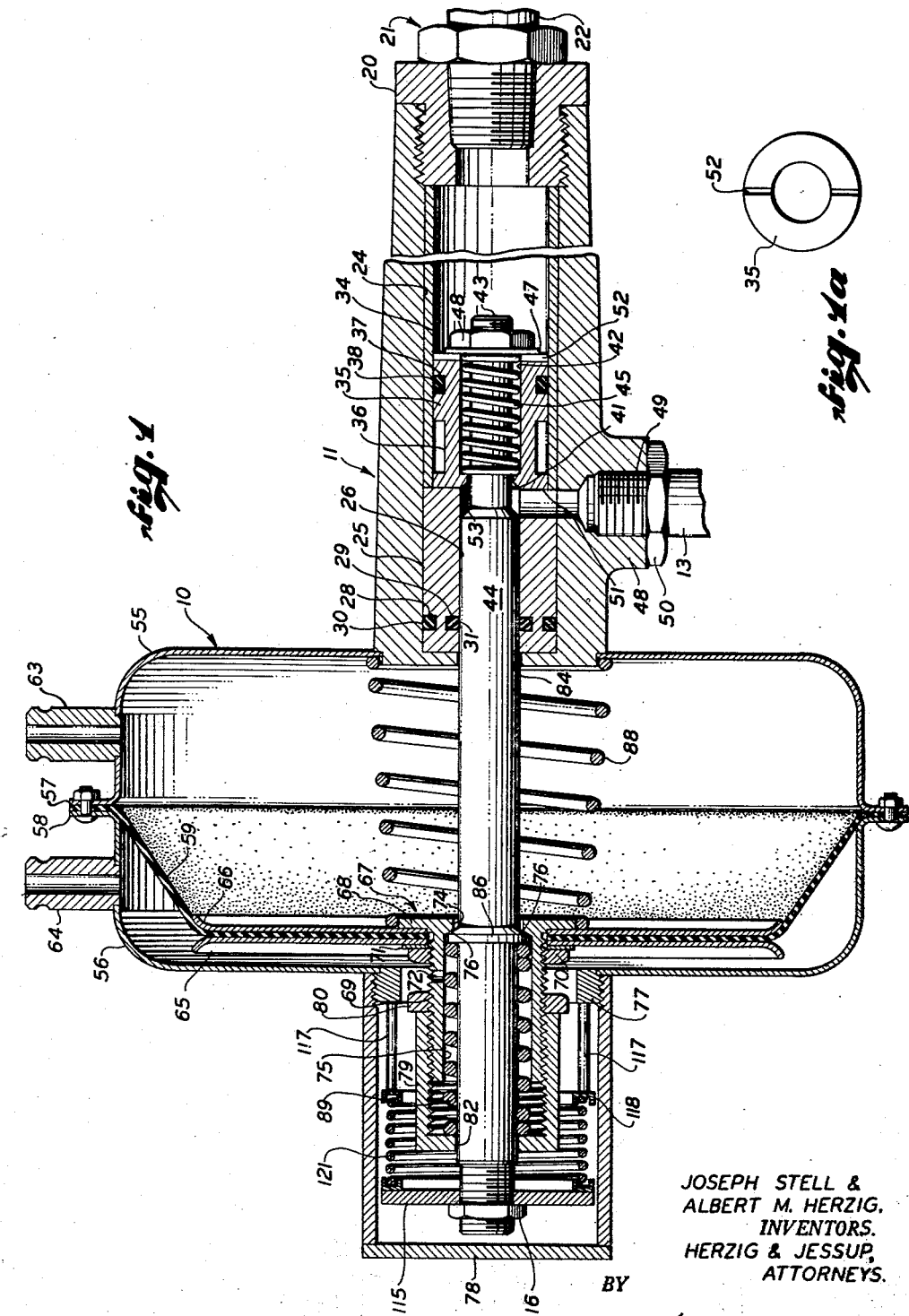
JOSEPH STELL &
ALBERT M. HERZIG,
INVENTORS.
HERZIG & JESSUP,
ATTORNEYS.
BY

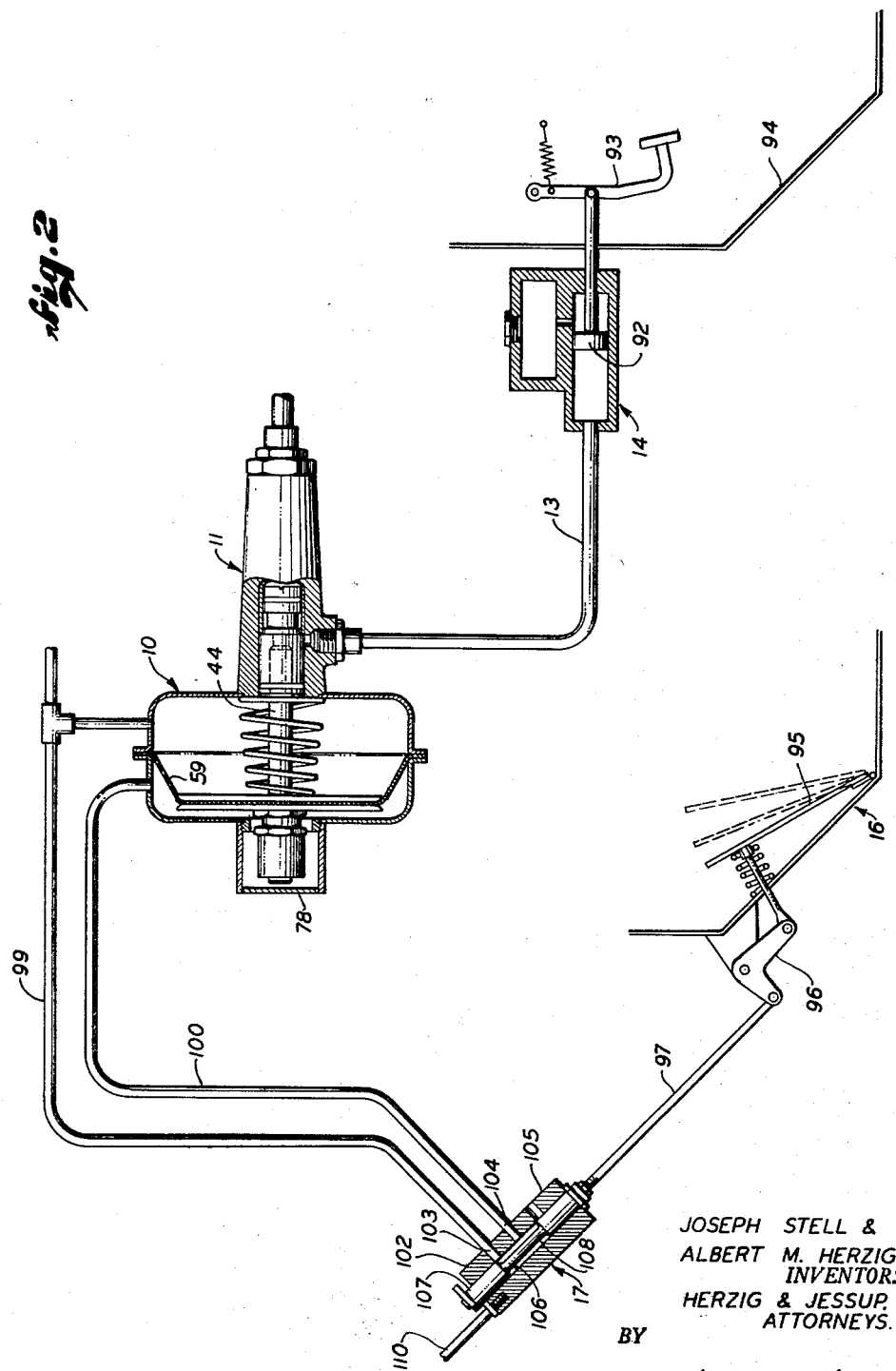

United States Patent Office 3,126,987
Patented Mar. 31, 1964

3,126,987
DECELERATOR BRAKE FOR MOTOR VEHICLES
Joseph Stell and Albert M. Herzig, Los Angeles, Calif., assignors to Automatic Brake, Inc.
Filed Sept. 15, 1959, Ser. No. 840,159
6 Claims. (Cl. 192—3)

This invention relates to automatic decelerating mechanism associated with and operated by the accelerator pedal, or the like, and the brake mechanism of an automobile or other motor vehicle.

It is intended by the present invention to provide improvements over prior art devices heretofore intended to accomplish generally similar purposes. Particularly the invention is an improvement over the decelerator brake disclosed in our issued Patent No. 2,870,885.

A purpose and object of the invention is to provide an improved automatic decelerator action for a motor vehicle after the removal of the operator's foot from the propelling fuel range of the accelerator control pedal and before his actuation of the foot brake pedal.

As explained in the earlier patent referred to, ordinarily simply a slowing up of a vehicle is all that is necessary to avoid the danger of impact or collision. The operator of a motor vehicle is repeatedly and rapidly subjected to the requirement of making three basic decisions, i.e., to slow up, to stop, or go forward. Fractions of seconds saved in the making and execution of the decisions may spell the difference between safety and danger and possible accident.

Automatic decelerator action creates a uniform operator pattern causing smooth control of the slow-up of the speed and automatically puts the vehicle in a caution phase of control before a decision is made and executed by the operator whether to further slow up and stop by active use of the foot brake pedal. As the operator instinctively retracts his foot from the propelling fuel throttle range, the automatic decelerator is actuated, causing a uniformly smooth snubbing and slow-up control of the brake mechanism of the vehicle. This automatically takes place before a decision is made and executed by the operator either to manually increase the deceleration rate and/or achieve a complete stop with the additional aid of the foot brake pedal.

The use of an automatic decelerator brake such as shown in the earlier patent referred to has additional specific advantages and purposes as outlined more in detail therein. The improvement of the herein invention has to do with the setting of the decelerator brake whereby it is capable of applying a precise degree of braking and consequent deceleration such that there can be no danger that the automatic braking might put the vehicle into a skid at any particular speed or under any particular conditions.

Research studies have been made which have resulted in information as to automobile stopping distances for different road conditions and at various different speeds. This information is available in terms of shortest stopping distance, for example on dry concrete or dry bituminous pavement, and average or decelerating stopping distance, for example on wet concrete or wet bituminous pavement. The herein invention provides means for precisely setting the decelerator brake to provide automatically the proper braking action so as to decelerate the automobile at a rate which accomplishes the purpose of the decelerator brake but without danger or exceeding the safe decelerating stopping distance.

The invention utilizes preferably a vacuum booster unit which automatically applies a predetermined actuating force to the hydraulic brake fluid which is transmitted to the brakes. Embodied in the booster unit is a release valve which limits the application of power by the unit and which valve is balanced in its operation against the actual force applied by the booster unit to the hydraulic brake fluid. The unit therefore can be nicely adjusted to actually apply a predetermined actuating pressure or force to the hydraulic brake fluid without this amount being exceeded. Preferably the setting of the release valve is at the booster unit and remains fixed. However, means are provided for changing the setting so that it may be precisely adjusted to limit the degree of decelerating braking to insure safety for any particular vehicle and particular driving conditions normally encountered.

Additionally, embodied in the booster unit is an adjustable spring which is arranged to positively limit the force or power which can be applied by the unit even in the event of malfunction of the release valve.

A particular object of the invention therefore is to provide an improved automatic decelerator brake having means for precisely adjusting the degree of automatic braking provided so that it is within limits known to be safe.

Another object of the invention is to provide an improved decelerator brake as in the foregoing object, embodying a power unit for automatically applying the decelerating braking and having means limiting the decelerating braking which means is balanced against the actual braking pressure applied to the hydraulic brake fluid.

A more specific object of the invention is to provide an improved decelerator brake having a power unit arranged to automatically actuate a cylinder for applying pressure to the hydraulic brake fluid, the power unit embodying a release valve actuatable by a stem which connects to the cylinder which applies pressure to the brake fluid so that a predetermined reaction force in the stem operates the release valve to limit the application of decelerating braking force by the power unit.

Another object is to provide a decelerator brake as in the foregoing object wherein the booster unit is of a type having a diaphragm separating a pressure chamber and a vacuum chamber and the release valve is in the form of a by-pass valve in the diaphragm and carried thereby.

Further objects and numerous additional advantages of the invention will become apparent from the following detailed description and annexed drawings, wherein:

Another object is to provide a brake as in the foregoing, including means limiting the maximum force output of the booster unit.

FIG. 1 is a sectional view of a preferred form of the power unit and hydraulic cylinder of the invention and the setting means therefore;

FIG. 1a is an end view of the hydraulic cylinder; and

FIG. 2 is a schematic view of the unit of FIG. 1 embodied in the accelerator and braking system of a vehicle.

Referring now more particularly to FIG. 1 of the drawings, this figure shows in cross-section a booster power unit designated generally by the numeral 10, connected to actuate the piston of a hydraulic cylinder 11 which pressurizes hydraulic fluid which is communicated to the vehicle brakes. The cylinder 11 has a connecting pipe 13 which connects to the master cylinder 14 of the brake system, as shown in FIG. 2. The accelerator of the vehicle is shown generally at 16 in FIG. 2, and numeral 17 designates a pilot valve which is actuatable by the accelerator and which controls the power unit 10, as will be described more in detail hereinafter. The power unit 10 is actuated upon release of the accelerator pedal, as will be described.

As has been stated in the foregoing, the invention resides primarily in an improvement whereby the degree of decelerating force or decelerating braking may be nicely adjusted to positively insure that it is within safe limits for conditions normally encountered, and wherein the force created as a result of release of the accelerator pedal is actually balanced against the force applied to the hydraulic brake fluid so that the decelerating braking may be precisely limited.

The cylinder 11 in FIG. 1 is tapered as shown. Its right end is closed by a screw-threaded plug 20 as shown which has an internal screw-threaded bore receiving a screw-threaded nipple or fitting 21 at the end of a conduit 22 which communicates with a distributing manifold or the like which distributes the hydraulic fluid to the respective brake actuators.

The cylinder 11 has a bore 24 and in the left end of this bore is a plug member 25 having a bore 26 as shown. Member 25 has external and internal annular grooves as shown at 28 and 29, and in these grooves respectively are sealing O-rings 30 and 31. In the bore 24 in cylinder 11 between the plug 25 and the fitting 20 is a sleeve 34, and slideable in the sleeve is a piston 35. The piston 35 has an annular groove 36 and an annular groove 37 in which is a sealing O-ring 38.

The piston 35 has a bore 41 at the left end and a counter-bore 42. Extending through these bores is the end 43 of an actuating stem 44, the end being of slightly smaller diameter as shown. Numeral 45 designates a coiled compression spring around the end 43 of the actuating stem and within the counterbore 42. The right end of the spring 45 bears against a washer 47 which is held against the end of the piston 35 by a nut 48 screw-threaded onto the end of the stem 43. When stem 44 is moved to the right it tends to release the tension in the spring 45. Piston 35 has a diametrical slot 52 in its end as shown in FIG. 1a. Normally, hydraulic fluid may flow through bore 41, bore 42 and slot 52 until the shoulder 53 seats in piston 35 adjacent bore 41 as will be described.

Numeral 48 designates a boss at one side of the cylinder 11 having a screw-threaded bore 49 which receives a nipple or fitting at the end of the conduit 13, which fitting is secured by the nut 50. The bore 49 communicates with the bore 26 by way of a bore or channel as shown at 51 formed in the plug member 25 and in a side wall of the cylinder 11.

Hydraulic fluid pressure from the master cylinder actuated by the foot brake pedal may be applied through the conduit 13, through piston 35 and thence to the brake actuators.

The power unit 10 is comprised of cup-shaped members 55 and 56 having annular flanges 57 and 58 which are attached by bolts as shown, having the peripheral portions of a flexible diaphragm 59 secured therebetween as shown, the diaphragm 59 being within the power unit as shown. The right side of the unit is the vacuum unit, and the left side is the atmospheric or pressure side, these respective sides having nipple connections thereto as shown at 63 and 64.

The diaphragm 59 has circular metal plates or diaphragms 65 and 66 on opposite sides thereof. These diaphragms have central apertures as shown, and extending through the apertures is a fitting member 67 having a flange portion 68 which engages the diaphragm 66 and a screw-threaded neck or throat portion 69. On the threaded throat portion is a nut 70 which secures the diaphragms 59, 65 and 66 together at the center between the nut and the flange 68, there being a washer 71 interposed between the nut 70 and the diaphragm 65. Orifice 72 admits pressure to member 69.

The member 67 has a central bore 74 forming a valve opening and a connecting counter-bore 75 having a slanting shoulder at the bottom thereof forming a valve seat, as shown at 76.

The member 56 has a central opening in which fits a screw-threaded ring member 77, and engaged on this member is a cylindrical cap 78 as shown.

Engaged on the screw-threaded throat 69 is a threaded cap member 79, the end of which engages against a lock nut 80 on the screw-threaded throat 69. The cap member 79 has an opening 82 in its end through which extends the end of the stem 44. The stem extends through an opening 84 in the end of cylinder 11 through the valve opening 74, and on it is disposed a valve member 86 which co-operates with the valve opening 74 and the valve seat 76.

Within the power unit 10 is a coiled tapered compression spring 88 which engages the member 55 at one end and the diaphragm 66 at the other end, and this spring normally urges the diaphragm 59 to the left.

Within the counter-bore 75 in the member 67 is a coil spring 89, one end of which bears against the valve member 86 and the other end of which bears against the inside of the cap 79. The spring 89 normally urges the valve 86 against its seat.

As may be seen, the valve formed by the member 86 and seat 76 are carried by the diaphragm assembly 59 as well as the adjustment for the spring 89 which biases the valve 86 towards its seat. The spring 89 is adjustable by loosening the lock nut 80 and then adjusting the cap 79 to adjust the tension of the spring, after which the lock nut 80 may again be set up against the end of the cap 79.

The left end of stem 44 is screw-threaded carrying spring retainer disc 115 and adjusting nut 116. Attached to ring 77 are stems or rods 117 carrying spring retainer 118. Between the spring retainers is coil spring 121 adjustable by nut 116. The adjustment of spring 121 is a more or less permanent one positively limiting the power or force that can be exerted on stem 44 by the booster unit. In other words, in any event, even malfunction, the unit can only exert a braking effect as limited by spring 121.

The diaphragm 59 is movable in the power unit 10 as a result of a differential in pressure or vacuum on opposite sides of the diaphragm. In other words, if the chamber to the right of the diaphragm is subjected to vacuum and atmospheric or higher pressure is admitted to the chamber to the left of the diaphragm, the diaphragm will move to the right against the force of springs 88 and 121 moving the stem 44 to the right and relieving the tension in spring 45 until shoulder 53 seats against piston 35 sealing off flow from channel 51 and allowing piston 35 to exert pressure in cylinder 11. As may be seen, as force is applied through the stem 44, the reaction of this force in the stem 44 is against the spring 89 acting against valve member 86. Upon the application of a predetermined force or pressure by the stem 44, the reaction will be sufficient to compress the spring 89, causing valve member 86 to move away from its seat, thus opening the aperture 74 and allowing release of pressure through the diaphragm assembly.

The magnitude of this reaction force or braking effect is determined primarily by the adjustment of spring 89. Spring 121 however also resists movement of stem 44 to the right; its setting is more or less permanent and it positively limits the force that can be applied to stem 44 by the booster unit.

As may be seen, the aperture 74 provides a by-pass from one side of the diaphragm to the other, that is, from the high pressure to the low pressure side; when this aperture is open pressure is released from the high pressure side to the low or vacuum side, thereby limiting the force that is developed by the power unit on the stem 44. As may be seen, operation of the valve 86 is balanced against the force exerted on the hydraulic brake fluid by the power unit 10 and upon the application of a precise degree of decelerating braking effort the valve 86 will open and release pressure from the high side of the unit 10, thus limiting the force applied. The operation of valve 86 is controlled directly by the actual force applied and transmitted to the brakes so that the degree of decelerating braking can be accurately and precisely set so as to be within a limit for any particular conditions encountered to insure safety, particularly against skidding resulting from excessive braking.

FIG. 2 shows the system diagrammatically as incorporated in a vehicle. The master cylinder 14 has in it a piston 92 actuated by a stem connected to the brake pedal 93 of the automobile, the driver's compartment being shown diagrammatically at 94.

The vehicle accelerator is shown at 16. It comprises the pedal 95 connected by a stem to a pivoted bell crank lever 96, one arm of which is connected by a stem 97 to a pilot valve as designated at 17. Pilot valve 17 controls the power unit 10 by way of a vacuum connection 99 and an atmospheric or pressure connection 100. The connection 99 may be connected to any suitable source of vacuum such as the intake manifold of the automobile or the vacuum side of the fuel pump. The pilot valve 17 comprises a cylindrical valve body 102 having ports 103, 104 and 105 which may have communication with a bore 106 in the number 102. The valve member 107 is a cylindrical member having a central narrowed neck or stem portion 108 so that the larger end portions can cover and uncover the ports 103 and 105. Port 105 is open to atmospheric pressures; port 103 connects by tube or connection 99 to the source of vacuum, and port 104 connects by tube or connection 100 to the high side of the power unit 10.

The pilot valve 17 may be mounted on the screw-threaded end of a stem as shown at 110 for example, which may provide an adjustment whereby to adjust the precise positions of the accelerator pedal 95 at which decelerating braking is applied.

FIG. 2 shows various positions of the accelerator pedal 95. In the full line position the pedal has not been released sufficiently to apply decelerating braking. In this position the pilot valve 17 is in the position shown in the drawing in which ports 103 and 104 are in communication, and vacuum is communicated to the left side of the diaphragm 59 so that the unit 10 applies no power or force to the stem 44. As the accelerator pedal 95 is released it moves to a position tending to pull downwardly on the stem 97 so that the valve member 107 begins to close off port 103 and open port 105 to the atmosphere. At a predetermined released position of the accelerator pedal 95, the decelerator braking effect is fully applied to the extent that it can be, by release of the accelerator pedal, its application being limited by the unit 10 as previously described. When valve member 107 closes off port 103, vacuum is cut off from the chamber on the left side of the diaphragm 59. At this time ports 104 and 105 are in communication and atmospheric pressure is admitted to the chamber on the left side of diaphragm 59, the right side of the diaphragm being exposed to vacuum as described. The diaphragm 59 now moves to the right as described in detail in connection with FIG. 1, causing the stem 44 to move to the right, relieving the tension on the spring 45 and moving the piston 35 to the right after shoulder 53 engages the piston pressurizing the hydraulic fluid in the cylinder 11. As described in the foregoing, when this pressure reaches a predetermined amount and a corresponding predetermined pressure is being transmitted to the brake actuators, the reaction force exerted against the spring 89 will cause the valve 86 to unseat. This releases pressure on the left side of diaphragm 59 by-passing it into the vacuum chamber on the right side of the diaphragm. Thus this precisely limits the degree of automatic decelerating braking effect that can be applied, and this limit is precisely established irrespective of the exact position of the pilot valve 17 or the exact position of the accelerator pedal 95. The limit is imposed by the mechanism within the power unit 10 itself. Additional air supplied to the carburetor during deceleration improves combustion.

As explained, the setting within the unit 10 which limits the degree of decelerating braking which can be applied is determined by the setting of the cap 79 which is within the unit and is only accessible by removing the outer cap 78. Thus, the desired appropriate setting can be made on the unit which is appropriate for the particular vehicle and the driving conditions normally encountered. The setting can of course be readjusted as necessary in the manner described. The setting of spring 121 ordinarily remains fixed. As stated, it imposes a positive limit to the force that could be exerted by stem 44 even if valve 26 failed to unseat.

From the foregoing, those skilled in the art will appreciate the significance of the invention and understand the manner in which it achieves its objectives. For a fuller appreciation of the invention and the correlation of the setting of the unit 10 with stopping distances, reference may be had to the table given hereinafter which shows the maximum limits of deceleration contemplated by the invention. "Panic Stopping" has reference to sudden and dangerous stops resulting from full application of the brakes by an operator in dangerous circumstances or otherwise. "Decelerating Stopping" has reference to stopping under conditions of controlled deceleration, i.e., an average stopping distance which may result from controlled deceleration, using a safely limited braking effect.

*Table*

| Vehicle Speed | Panic Stopping Distance | Decelerating Stopping Distance |
| --- | --- | --- |
| 20 M.P.H. | approx. 18 ft. | approx. 28 ft. or more. |
| 40 M.P.H. | 84 ft. | 127 ft. |
| 60 M.P.H. | 197 ft. | 300 ft. |
| 80 M.P.H. | 350 ft. | 535 ft. |

From the foregoing it will be observed that the invention provides with a single predetermined setting several desirable characteristics. It provides for predetermined limited braking resulting in a cushioned deceleration sufficiently limited to avoid the danger of skidding. The predetermined setting also provides a hill-holding feature and an anti-creep capability in vehicles having automatic transmissions. The invention is characterized particularly in that the booster power unit has a single setting as described which accomplishes the purpose. By way of example, the pressure necessary in the cylinder 11 might be 250 pounds per square inch gauge to produce the desired limited braking effect sufficient to safely decelerate without skidding. The pressure generated in the cylinder 11 which would be sufficient for rapid stopping, for example at the maximum rate of stopping as distinguished from safely controlled deceleration, might be 400 pounds per square inch gauge. In these respects the invention is superior to decelerator brake units which have been known to the prior art, particularly in that its setting is fixed and it is not dependent upon the use of bleed ports or comparable variables; its force as described is directly balanced against the applied braking force to limit the decelerating braking effect.

The stopping distances listed in the above table are on dry concrete or dry bituminous pavement but are also satisfactory on such wet pavement. Stopping distances on dry ice or packed snow are approximately twice the decelerating stop distances for the corresponding speeds. Stopping on wet ice takes longer, but in each condition the herein invention can be pre-set if desired to a predetermined limiting automatic braking effect to achieve a corresponding satisfactory and safe decelerating stop.

The foregoing disclosure is representative of a preferred form of the invention and is to be interpreted in an illustrative rather than a limiting sense. Various modifications and alternatives in the invention may occur

What is claimed is:

1. A vehicle having brakes; brake applying means connected to said brakes; a brake actuating power unit having a brake actuating member operatively connected to said brake applying means and driven by a movable pressure responsive member which is subject to differential pressure on opposite sides thereof; valve means operatively connected to said power unit for regulating the pressure difference on the opposite sides of said pressure responsive member; an accelerator having operative connection to said valve means to actuate the same; means defining a by-pass passageway between the opposite sides of said pressure responsive member; valve means normally closing said passageway; and means responsive to a predetermined pressure difference on said pressure responsive member for opening said second-named valve means whereby to limit the force applied to said brake actuating member.

2. A vehicle as defined in claim 1 including restricting means connected to said actuating member to limit the maximum force that can be transmitted by said actuating member to said brakes.

3. A vehicle as defined in claim 1 wherein said pressure responsive member and said actuating member are relatively movable; said second-named valve means being connected to said members for actuation by relative movement therebetween.

4. A vehicle as defined in claim 3, wherein said second-named valve means is carried by said pressure responsive member.

5. A vehicle as defined in claim 3 including yieldable means drivingly connecting said pressure responsive member to said actuating member thereby to limit the force said pressure responsive member can exert on said actuating member without relative movement therebetween.

6. A vehicle as defined in claim 5 including means operatively connected to said yieldable means for adjusting the latter to regulate the value of said force.

References Cited in the file of this patent

UNITED STATES PATENTS

| | | |
|---|---|---|
| 2,357,986 | Wichterman | Sept. 12, 1944 |
| 2,626,026 | Sherwood et al. | Jan. 20, 1953 |
| 2,643,746 | Righter | June 30, 1953 |
| 2,843,093 | Vltavsky | July 15, 1958 |
| 2,870,885 | McIntosh et al. | Jan. 27, 1959 |
| 2,881,879 | Perrino | Apr. 14, 1959 |